July 17, 1956 L. C. YOUNG 2,754,555
MOLD ASSEMBLING APPARATUS
Filed Jan. 4, 1952 3 Sheets-Sheet 1

INVENTOR.
LESTER C. YOUNG
BY Woodling and Krost
attys

INVENTOR.
LESTER C. YOUNG
BY Woodling and Kroet
attys

July 17, 1956  L. C. YOUNG  2,754,555
MOLD ASSEMBLING APPARATUS
Filed Jan. 4, 1952  3 Sheets-Sheet 3

INVENTOR.
LESTER C. YOUNG
BY Woodling and Kroet
attys

United States Patent Office 2,754,555
Patented July 17, 1956

2,754,555

MOLD ASSEMBLING APPARATUS

Lester C. Young, Cleveland, Ohio, assignor to Spo, Inc., a corporation of Ohio

Application January 4, 1952, Serial No. 264,870

2 Claims. (Cl. 22—31)

This invention relates to foundry equipment in general, and relates more specifically to apparatus for machine closing of flask parts to form a mold.

The object of this invention is to provide a precision machine for assembling flask parts into a completed mold.

Other objects and a fuller understanding of the invention may be had by referring to the following description and claims, taken in conjunction with the accompanying drawings, in which:

Figure 1:
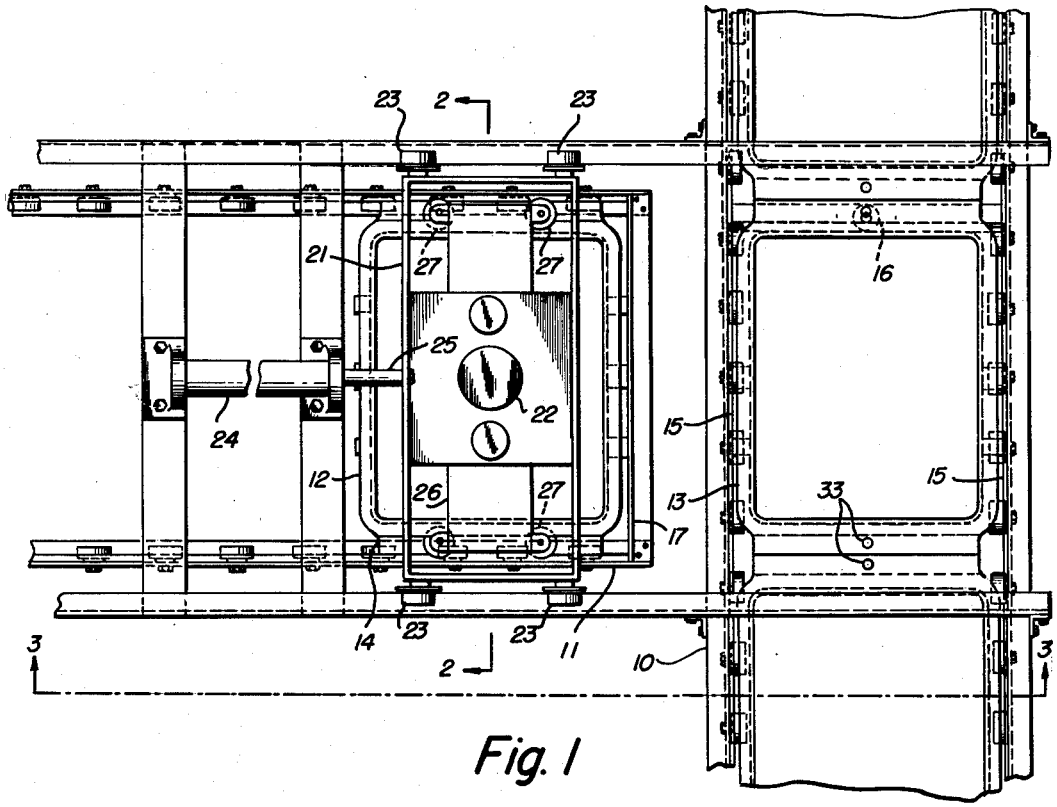
Figure 1 is a top plan view of the transfer station area of two converging conveyors, with the closing apparatus of this invention installed for closing mold parts from each conveyor into a finished mold.
Figure 2:
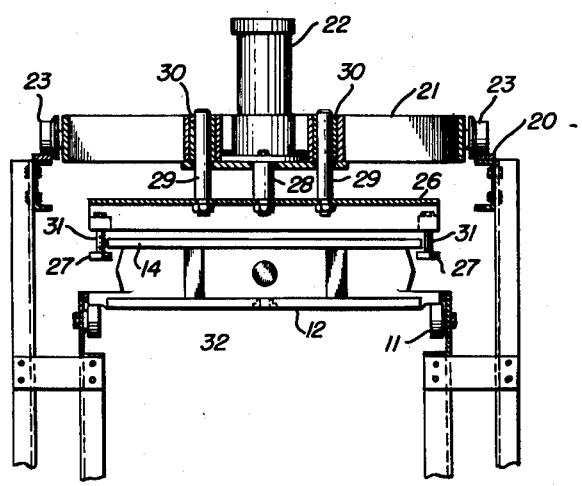
Figure 2 is a view taken along line 2—2 of Figure 1.

The illustrated embodiment of the invention for machine closing of flask members is illustrative of the principles involved, and is sufficient to teach those skilled in the art the necessary principles to practice the invention.

The closer apparatus illustrated in the drawings comprises a drag conveyor 10 and a cope conveyor 11. The copes and drags may come from any source, either standard foundry making machines or fully automatic mold making machines. This apparatus is independent of the source of the molds.

In the drawings copes 12 and drags 13 are illustrated in position upon their respective conveyors. These copes and drags may be of any suitable design, except for the requirement of a flange 14 on the copes. The copes and drags illustrated in the drawings are of the design shown and described in my application entitled "Foundry Flask," Serial No. 264,967, filed January 4, 1952, but as previously stated can be of any suitable design except for the necessity of the flange 14 on the copes. As the drags 13 are conveyed from their source along the conveyor 10, they encounter lateral spacers 15 which bring them to a precise lateral position upon the conveyor 10. Also a longitudinal stop 16, which comprises merely a spring loaded cylinder with a stop finger thereon, is positioned to arrest the forward movement of the drags 13 at a precise longitudinal position upon the conveyor 10. A traveling indexer, a push rod, or any suitable means may be employed to move the drags into snug contact against the finger of the longitudinal stop 16.

The cope conveyer 11 approaches closely to the drag conveyer 10, preferably at a perpendicular, or right angle, with respect to the drag conveyer 10. A fixed stop 17 near the end of conveyor 11 causes the copes to reach a precisely determined longitudinal position with respect to the accurately located drag upon the conveyor 10.

An overhead track, or rail, 20 extends along above the conveyor 11 and bridges over the conveyor 10. Preferably the track 20 extends in the same path as the conveyor 11. A shuttle carriage 21 is mounted to ride upon the track 20. Preferably wheels 23 are employed to permit smooth and easy longitudinal travel of the carriage 21, rather than slides or guide rails. An air cylinder 24, with a rod 25 operated thereby, is attached to the shuttle carriage 21 and serves as a prime mover to shuttle the carriage through a precise reciprocable path upon the track 20. An air cylinder 22, or similar lifting apparatus, is mounted upon the shuttle carriage 21 and serves as the prime mover and lifting apparatus for the crane structure of the carriage. A rod 28 from the cylinder 22 extends downwardly to a spanner bar 26. Guide bars 29, operating in guide bushings 30 of the carriage, assure the smooth vertical movement of the spanner bar 26. Two roller fingers 27 are positioned in spaced relationship at each end of the spanner bar 26, and serve as grip members to pass under the flange 14 of the cope 12 and lift the cope from the conveyor 11. The rollers 27 are carried by shafts 31, and accordingly the combination of the rollers 27 and shafts 31 provides an inwardly extending finger construction to pass under the flange 14. The length of the spanner bar 26 and the spacing of the shafts 31 thereon are such that the flange 14 fits closely between the shafts 31 for accurate lateral positioning of the cope 12 with respect to the positioned drag 13 on conveyor 10.

Figure 3:
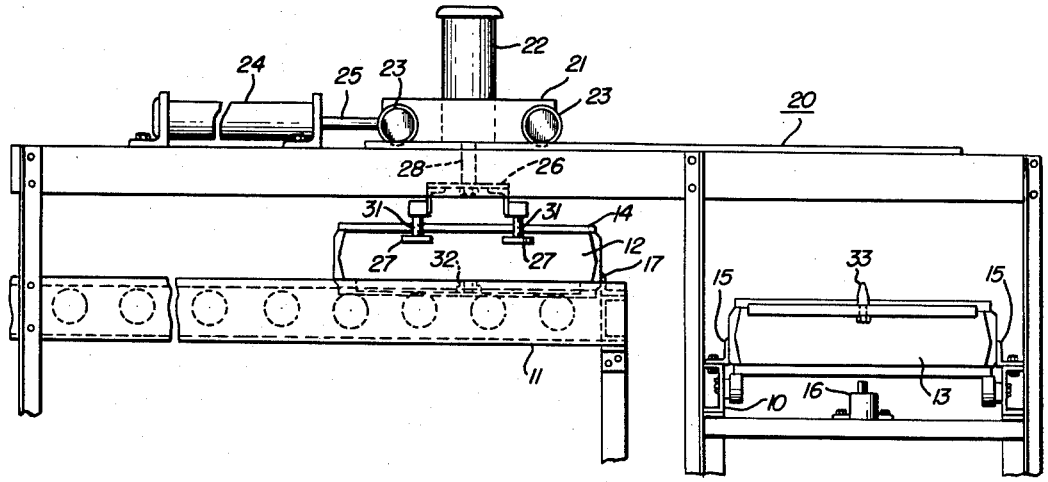
Figures 3 through 6 illustrate the successive steps of a mold closing cycle conducted by the apparatus of this invention, as seen from a side elevation of the apparatus.

By providing the system of lateral guides and longitudinal stops, it will be readily appreciated that the copes and drags may be brought into an accurately predetermined relationship with respect to one another in an area of the two conveyors under the overhead track which may be referred to as the transfer station area. The key to the successful machine closing of the copes and drags is this accurate spacing of the copes and drags with respect to one another upon the original conveyors. The system of closing the mold is then illustrated in Figures 3 through 6 of the drawings. In Figure 3 the crane has been lowered and the shuttle has been retracted to allow the roller fingers 27 to pass under the flange 14 of the cope 12. It may be seen in this series of figures that the conveyor 11 is elevated to a higher plane than the conveyor 10. Such elevation reduces the amount of lifting which must be done by the crane.

Figure 4:
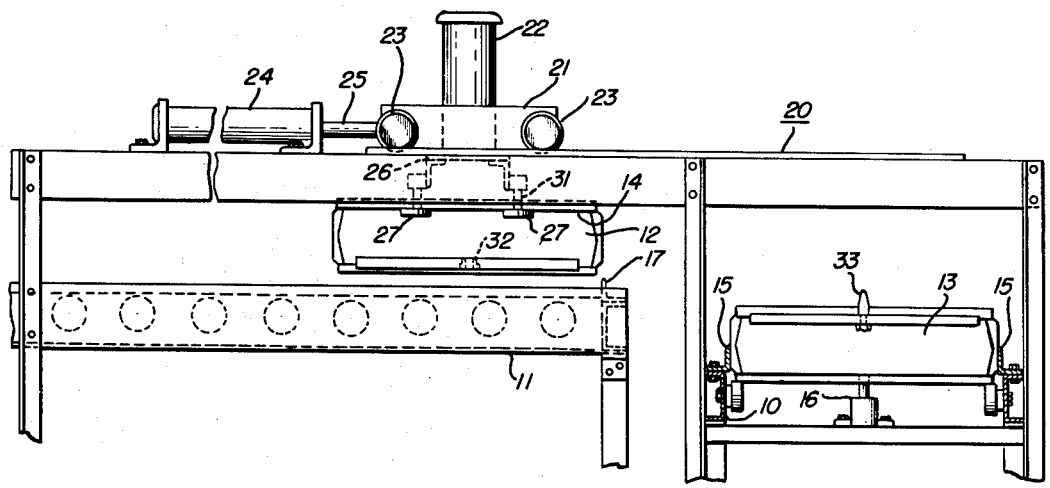

In Figure 4 the next step of the operation is illustrated. The cylinder 22 is actuated to lift the cope by drawing the crane mechanism upwardly and catching the fingers 27 under the flange 14.

Figure 5:
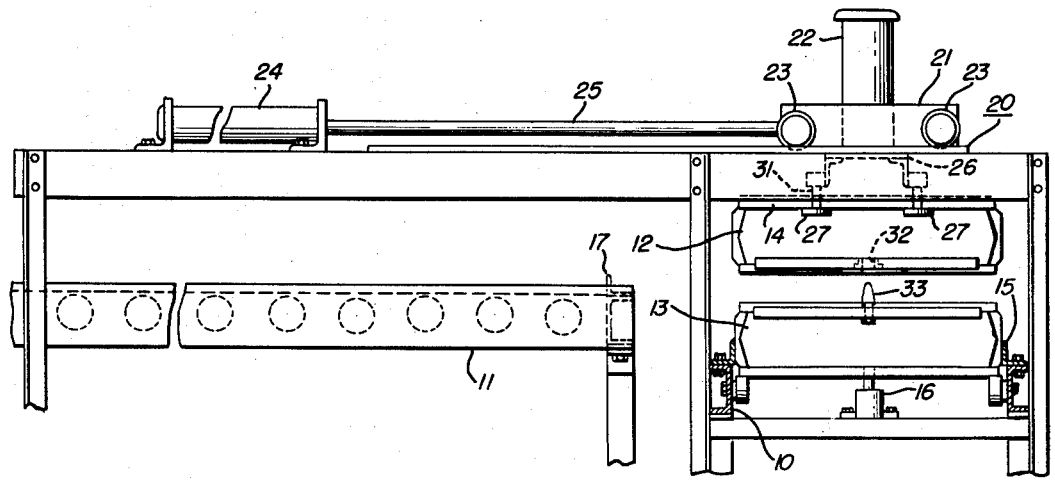
Figure 6:
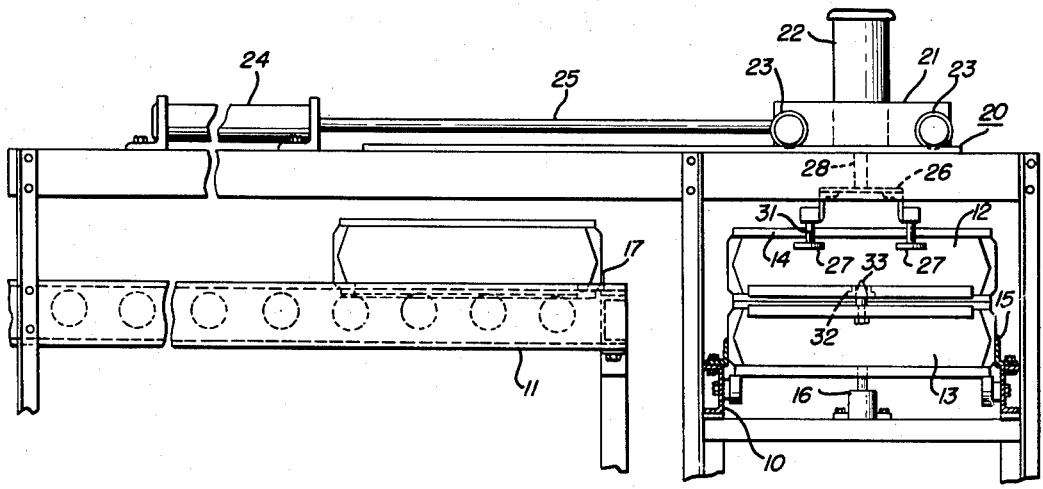

Next, as illustrated in Figure 5, cylinder 24 is actuated to drive the carriage to a position over the prepositioned drag 13 on the conveyor 10.

Finally the cylinder 22 is again actuated to lower the crane mechanism and settle the cope upon the drag. A guide pin 31 on the drag and a guide pin bushing 32 on the cope provide the exact precision alignment of the cope and drag members in the usual well-known manner. From the position of Figure 6, the carriage is returned to the position illustrated in Figure 3 with the crane mechanism remaining lowered on the return trip. Thereby the fingers 27 are below the plane of the flange 14, and are thus readied for engagement and lifting of the cope by simply actuating the cylinder 22 again. At the same time, as the lowered crane mechanism passes the cope on the return movement of the carriage, if the cope should be laterally misplaced, the fingers will contact the cope and move it into correct lateral alignment.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mold closer apparatus for fitting copes upon drags comprising, first and second conveyors arranged to approach one another at a transfer station, said first conveyor for copes being arranged at a higher elevation than said second conveyor for drags, said copes and drags being placed on said conveyors to move toward said transfer station, the copes on said first conveyor having flanges parallel with said first conveyor, an overhead rail bridging over said conveyors and transfer station, a carriage mounted by said rail, crane means carried by said carriage, said crane means including a cylinder on said carriage, a piston in said cylinder having a piston rod extending downwardly from said cylinder, a horizontal hanger bracket connected to said piston rod, a guide bar connected to said bracket and slidably engaged with said carriage to prevent turning of said hanger about the axis of said piston rod, fixed position fingers carried by said hanger bracket, said carriage and crane being movable above said first more elevated conveyor to engage under said cope flanges to lift said cope from said first conveyor and position it upon a drag on said second lower conveyor whereby said fingers will then be disposed in a plane under said flanges of a second cope on said first more elevated conveyor, whereupon rectilinear return movement of said carriage, crane and fingers in a plane parallel with said first conveyor to a place above said first conveyor will, by said rectilinear movement alone, place said fixed fingers under the flanges of said second cope on said first more elevated conveyor.

2. A mold closer apparatus for fitting copes upon drags comprising, first and second conveyors approaching each other at a transfer station, said copes and drags being placed on said conveyors to move toward said transfer station, said cope having a first flange on one side thereof and having a second flange on the other side thereof, said first and second flanges having edges spaced apart a predetermined distance and being substantially parallel with said first conveyor, an overhead rail bridging over said first and second conveyors at said transfer station, a carriage mounted on said rail, a lifting device carried by said carriage, said lifting device including first and second suspension means spaced apart a distance greater than said predetermined distance, each of said suspension means having engageable means secured thereto and spaced apart a distance less than said predetermined distance for engaging said flanges of said cope, means for preventing turning of said lifting device relative to said carriage for aligning said engageable means with said flanges to position said engageable means under said flanges, said lifting device movable between an extended and a retracted position, said engageable means in said extended position of said lifting device being beneath said first and second flanges of said cope, means for operating said lifting device to said retracted position to raise the engageable means and contact said flanges for lifting said cope from said first conveyor, said carriage means movable between a first position over said first conveyor and a second position over said second conveyor, means for moving said carriage means and said lifting device carried thereby from said first to said second position to transport said cope to said second conveyor over said drag, means for operating said lifting device to said extended position to deposit said cope on said drag, and means for moving said carriage means and said lifting device carried thereby from said second to said first position to position said engageable means beneath the flanges of another cope.

References Cited in the file of this patent

UNITED STATES PATENTS

| | | |
|---|---|---|
| 1,538,576 | Mulvihill | May 19, 1925 |
| 1,836,444 | Carnahan | Dec. 15, 1931 |
| 2,176,251 | Duhan | Oct. 17, 1939 |
| 2,524,846 | Socke et al. | Oct. 10, 1950 |
| 2,525,572 | Woody et al. | Oct. 10, 1950 |
| 2,598,222 | Cahners et al. | May 27, 1952 |

FOREIGN PATENTS

| | | |
|---|---|---|
| 856,297 | France | Mar. 18, 1946 |